United States Patent [19]

McCollum

[11] Patent Number: 5,640,890
[45] Date of Patent: Jun. 24, 1997

[54] TREPAN HOLDER FOR CUTTING STAINLESS STEEL HOSE FITTINGS

[75] Inventor: Brian Lee McCollum, Berne, Ind.

[73] Assignee: Dana Corporation, Toledo, Ohio

[21] Appl. No.: 323,714

[22] Filed: Oct. 18, 1994

[51] Int. Cl.$^6$ .............................. B23B 5/06; B23B 29/08
[52] U.S. Cl. .................................................. 82/121; 82/158
[58] Field of Search ........................... 82/158, 159, 161, 82/121

[56] References Cited

U.S. PATENT DOCUMENTS

| | | |
|---|---|---|
| 2,188,198 | 1/1940 | Bredenbeck . |
| 2,391,878 | 1/1946 | Cassia, Jr. . |
| 3,160,038 | 12/1964 | Wood . |
| 3,566,723 | 3/1971 | Oborne . |
| 3,709,074 | 1/1973 | Santerre ................................. 82/158 |

Primary Examiner—M. Rachuba
Assistant Examiner—Kenneth J. Hansen
Attorney, Agent, or Firm—Millen, White, Zelano, & Branigan, P.C.

[57] ABSTRACT

A trepan is mounted on the turret of a lathe-type machine tool for cutting a trepan groove in a stainless steel fitting used to couple a hose to a pipe. The cutter is secured to the turret by a holder which comprises a base having a longitudinally extending mounting foot and a transversely extending dovetail slot in which is mounted a dovetail slider having a longitudinal slot that restrains a trepanning cutter holder in which the trepanning cutter is mounted. An adjustment screw mounted for rotation only on the base, and threaded into the dovetail slider, provides for axial adjustment of the trepanning cutter and an adjustment screw mounted for rotation only on the dovetail slider, and threaded into the trepanning cutter holder, provides for longitudinal adjustment of the trepanning cutter.

4 Claims, 4 Drawing Sheets

TREPAN HOLDER FOR CUTTING STAINLESS STEEL HOSE FITTINGS

1. Field of the Invention

The present invention relates to a trepan holder. More particularly, the present invention relates to an adjustable trepan holder.

2. Background Art

Trepanning is a method used to cut concentric grooves around a bored or drilled hole. It is used for the manufacture of end fittings used to couple tubes and hoses for various applications such as, for example, coupling tubes and hoses in hydraulic connections.

High quality end fittings used, for example, to connect hoses to pipes may be made from stainless steel to minimize the corrosion problems which may occur with other metals. Stainless steel is frequently difficult to machine. Arrangements used for trepanning shallow groves in non-stainless steel parts are not suitable for stainless parts. The modified boring bar holder mounted in the saddle of a machine which has a large protrusion and little support does not work satisfactorily with stainless steel parts when relatively deep trepanning of perhaps 0.250 inch is necessary. Due to the lack of rigidity using the modified boring bar arrangement, trepanning of stainless steel cannot be accomplished without chatter which, of course, results in parts with uneven, gouged surfaces. When a high quality connection is desired, it is necessary that interfaced surfaces be as smooth as possible in order to minimize the chance of leaks and possible corrosion.

SUMMARY OF THE INVENTION

In view of the aforementioned considerations, it is a feature of the present invention to provide a new and improved trepan holder.

The present invention is directed to a holder for mounting a trepan cutter on the turret of a lathe-type machine for trepanning a rotating work piece. The holder includes a base having a foot for rigidly securing the base to the turret and a lateral dovetail groove therein extending in the direction transverse to the longitudinally extending foot. A dovetail slider is mounted in the dovetail slot for movement in a direction transverse to the longitudinal access of the turret. The dovetail slider has a longitudinally extending groove and a laterally extending threaded bore therein. A screw is mounted on a base for rotation only with respect to the base. The screw has a threaded portion received within the laterally extending threaded bore in the dovetail slider for translating the slider upon rotation of the screw so as to provide for lateral adjustment of the dovetail slider with respect to the base and the longitudinal groove in the slider. A trepan retainer is mounted in the slot in the dovetail slider, the trepan retainer includes a notch in one face thereof for rigidly mounting the trepan cutter and a threaded bore extending in the longitudinal direction. A screw is mounted for rotation only on the dovetail slider and extends in the longitudinal direction. The screw has a threaded portion received in the bore of the trepan retainer for adjusting the trepan retainer and thus the trepan cutter in the longitudinal direction.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 10 is a front view of the trepan holder of FIGS. 8 and 9; and

FIG. 11 is a back view of the trepan holder of FIGS. 8–10.

DETAILED DESCRIPTION

Figure 1:
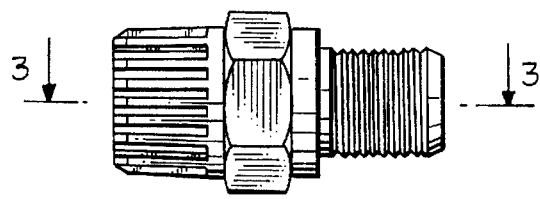
FIG. 1 is a side view of a stainless steel hose-to-pipe coupling to be trepanned in accordance with the principles of the present invention.
Figure 2:
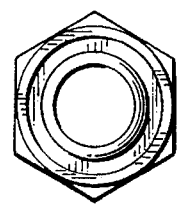
FIG. 2 is an end view of the fitting of fitting FIG. 1 observed in the direction of line 2—2.
Figure 3:
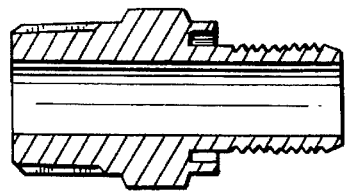
FIG. 3 is a side elevation taken along lines 3—3 of FIG. 2.

Referring now to FIGS. 1–3, there is shown a stainless steel hose-to-pipe coupling 10 in the form of a insert formed about an axis 11 for connecting a hose (not shown) to a pipe (not shown). The hose is connected to a first end 12 of the stainless steel coupling 10, while the pipe is connected at a second end 14 of the stainless steel coupling.

The first end 12 has a series of grooves 16 which form a grooved nipple 18 over which a hose is mounted. Proximate the inner end of the nipple 18 is a hex nut 20. Between the hex nut 20 and the nipple 18 is a groove 22 (FIGS. 2 and 3). The grove 22 is formed in the stainless steel of the coupling 10 by a trepanning operation in accordance with the present invention.

Figure 4:
FIG. 4 is a top view of a trepan insert used to machine an annular groove in the fitting of FIG. 3.
Figure 5:
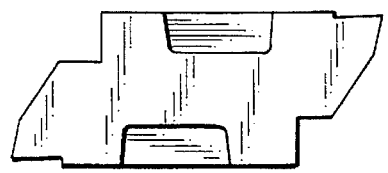
FIG. 5 is a side view of the insert of FIG. 4.
Figure 6:
FIG. 6 is a front view of FIG. 5 taken in the direction 6—6.

Referring now to FIGS. 4–6, there is shown a trepan cutter insert 30 which is used to trepan or cut the groove 22 (FIGS. 2 and 3) in the coupling 10. The trepan cutter insert 30 has a blade 32 with an edge 34. The blade 32 has a shank portion 36 which is unitary with a base portion 38. The base portion 38 has top and bottom notches 40 and 42, respectively, so that the trepan cutter insert 30 may be inverted to utilize a second blade 46 having an edge 48 having a size and configuration identical to the blade 32. The trepan cutter insert 30 is of a generally conventional configuration and is mounted on the machine of FIG. 7 using a holder configured in accordance with the instant invention disclosed in FIGS. 8–11.

Figure 7:
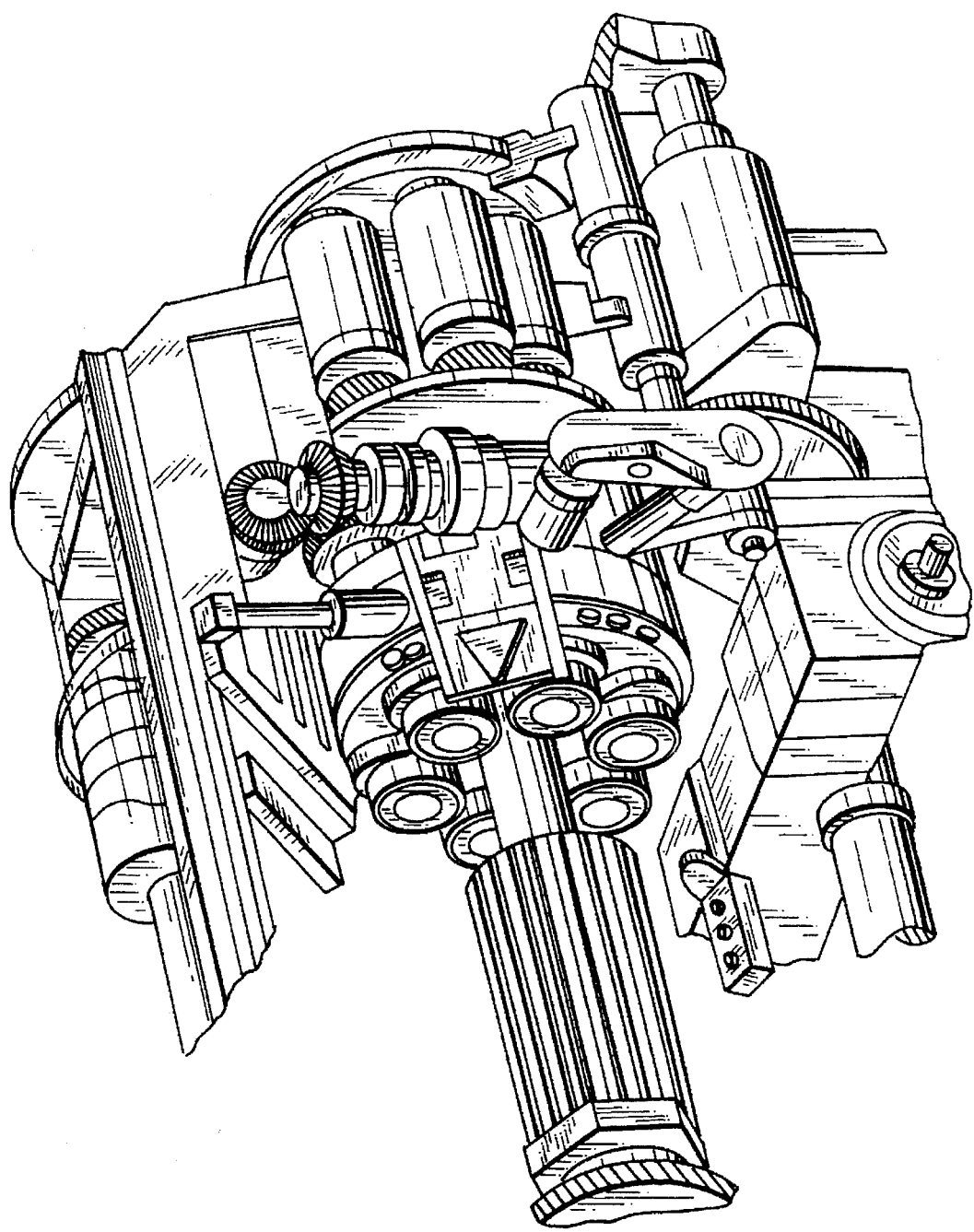
FIG. 7 is a perspective view of a portion of a spindle bar machine used to perform a trepanning operation in accordance with the principles of the instant invention.
Figure 8:
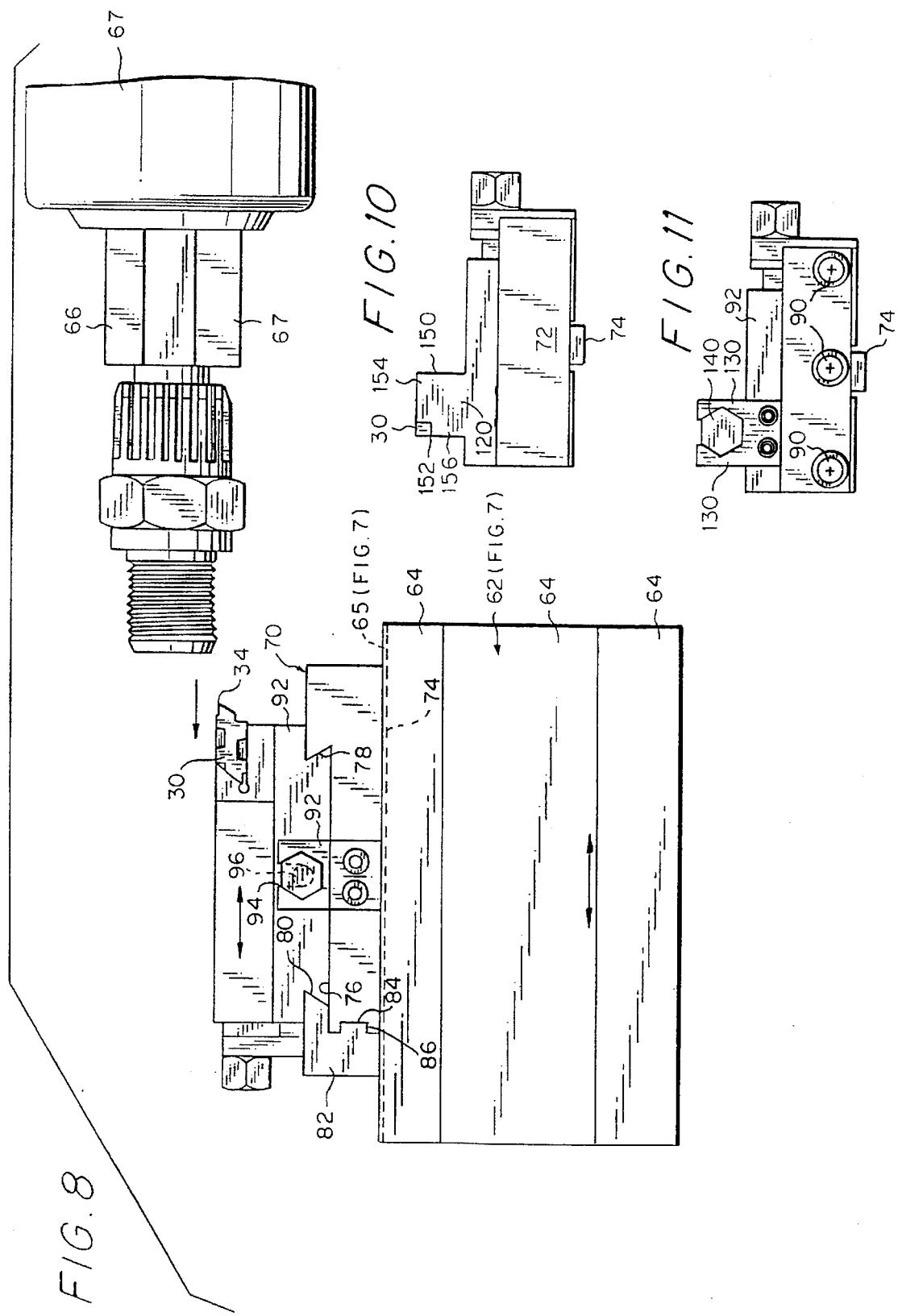
FIG. 8 is a side view of a trepanning holder mounted on the machine of FIG. 7 for mounting the cutting insert of FIGS. 4–6 to machine the hose-to-pipe coupling of FIGS. 1–3.
Figure 9:
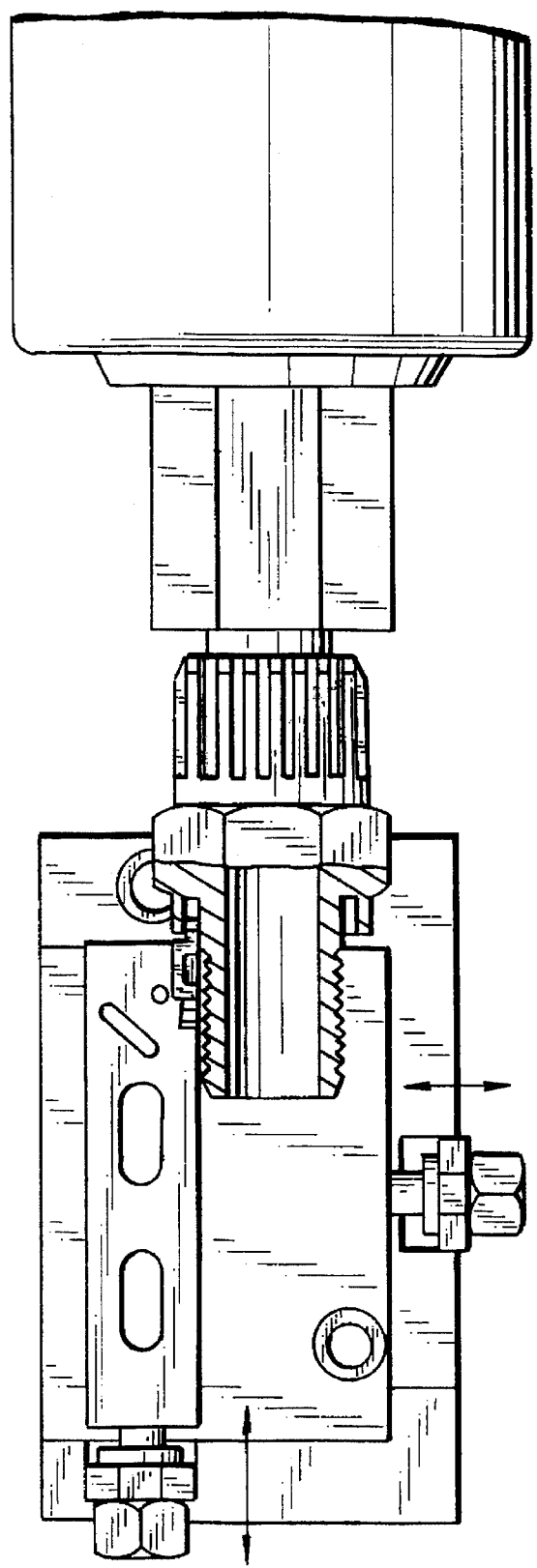
FIG. 9 is a top view of the trepan holder showing the cutting insert trepanning the hose to pipe coupling of FIGS. 1–3.

Referring now to FIG. 7, there is shown a portion of a multiple spindle bar machine 60 having a turret 62 which has six faces 64 thereon with grooves 65 for mounting up to a maximum of six of the cutters 30 (FIGS. 4–6). The multiple spindle bar machine 60 includes six rotating spindles 66 which support six hose-to-pipe couplings 10 (see FIGS. 1–3). In order to mount the cutters 30 on the faces 64 of the turret 62, the holders of FIGS. 8–11 configured in accordance with the present invention are used.

Referring now to FIGS. 8–11, there is shown a holder 70 configured in accordance with the principles of the present invention. The holder 70 includes a base 72 having a longitudinal shoe 74 (FIGS. 10–11), which longitudinal shoe is slidably received and retained in grooves 65 formed in one of the faces 64 of the turret 62 (also see FIG. 7). The longitudinal shoe 74 extends the full length of the base 72 and thereby provides lateral stability for the holder 70. The base 72 also includes a dovetailed slot 76 which extends transverse with respect to the longitudinally extending shoe 74. The dovetail slot 76 has a first angled wall 78 which is unitary with the base 72. The clamping block 82 (FIG. 11) is rigidly affixed to the based 72 by three bolts 90 which thread into the base 72.

Bolted to the base 72 is an L-shaped side adjusting block 92 which has a U-shaped slot 94 therein which receives a shank 96 of a first adjustment screw 98. The shank 96 has a unitary flange 99 thereon which cooperates with the head 100 of the first adjustment screw 98 to keep the bolt from moving longitudinally as it is rotated. The first adjustment screw 98 has a threaded end 102.

Mounted in the dovetail slot 76 is a dovetail slider 110. The dovetail slider 110 has a threaded bore 112 therein which receives the threaded shank 102 of the bolt 98. As the screw 98 is rotated in a first direction, the dovetail slider 110 moves in the direction of arrow 114 and when the screw 98 is rotated in a second opposite direction, the dovetail slider moves in the direction of arrow 116 (see FIG. 9). When the dovetail slider 110 is correctly positioned, the clamping bolts 90 are tightened to fix the dovetail slider 110 with respect to the base 72.

The dovetail slider 110 has a groove 120 formed therein which extends in the longitudinal direction as defined by the extension of foot 74 on the bottom of the base 72. Bolted to the side of the dovetail slider 110 is a rear adjusting block 130 which is similar in configuration to the block 92. The adjusting block 130 has a U-shaped slot 132 therein Which receives the shank 134 of second adjusting screw 136. The shank has unitary flange 138 thereon which retains the screw 136 in the U-shaped slot 132 by cooperating with the head 140 of the bolt so that the bolt can rotate but not slide. The screw 136 has a threaded end 142.

Mounted in the groove 120 of the dovetail slider 110 is a trepan retainer 150 for holding the trepan 30 of FIGS. 4–6. The trepan holder 150 includes a notch 152 proximate to an end face 154 thereof and proximate to a side surface 156 in which the trepan cutter 30 is rigidly mounted by using a standard top clamp 155 retained by a cap screw 156.

The trepan retainer 150 has a threaded bore 160 in the back end 162 thereof which receives the shank 134 of the second adjusting screw 136. As the screw 136 is turned, the trepan retainer 150 advances the trepan cutter 30 and thus the cutting edge 34 in the direction of arrow 170 and when the screw 136 is rotated in the opposite direction, the trepan retainer 150 moves the trepan cutter 30 in the direction of arrow 172.

The trepan retainer 150 includes two slots 173 and 174 therein which receive cap screws 175 and 176, respectively, which are threaded into the dovetail slider 110. When the cap screws 175 and 176 are tightened, the trepan retainer 150 is fixed with respect to the dovetail slider 110.

When trepanning the hose-to-pipe coupling 10, the end tool slide turret 62 moves in the direction 178 so that the cutting edge 34 of the trepan cutter 30 machines groove 22 as the hose-to-pipe coupling 10 is rotated by spindle 66 about the axis 11 of the coupling. The spindle does not translate during this operation but rather remains axially fixed as it rotates the coupling 10 being trepanned.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A combination comprising:

a stainless steel fitting for coupling a hose to a pipe, the stainless steel fitting having an axially opening groove located between a nipple portion of the fitting and a hex nut portion of the fitting;

a single trepan cutter;

a lathe machine tool having a turret which reciprocates in a longitudinal direction and a rotating spindle for holding the stainless steel fitting into which the axially opening groove is to be cut by the trepan cutter, wherein the turret includes at least one slot for receiving a holder for a trepan cutter;

a base on the holder having a longitudinally extending foot which is received in the slot of the turret and a dovetail slot extending transversely with respect to the longitudinally extending foot;

a first adjustment screw fixed for rotation only with respect to the base and having a first threaded shank;

a dovetail slider mounted in the dovetail slot for movement transverse of the longitudinally extending foot;

a threaded bore in the dovetail slider for receiving the first threaded shank to adjust the lateral position of the dovetail slider, the dovetail slider having a longitudinally extending groove therein;

a trepan retainer mounted in the longitudinal slot for movement in the longitudinal direction, the trepan retainer including a notch for mounting the trepan cutter and a longitudinally extending threaded bore; and a second adjustment screw mounted on the dovetail slider for rotation only with respect to the dovetail slider, the second adjustment screw having a threaded shank receivable in the threaded bore in the trepan retainer for adjusting the position of the trepan cutter in the longitudinal direction, whereby the stainless steel fitting and trepan cutter are stabilized during cutting of the groove to minimize chatter and machine grooves with even surfaces.

2. The combination of claim 1, wherein the dovetail slot in the base is defined by a first slanted surface unitary with the base and a second slanted surface opposed to the first slanted surface and occurring on a clamping block which is bolted to the base.

3. The combination of claim 1, wherein the first adjustment screw is mounted on the base by an adjustment block bolted thereto wherein the adjustment block includes a U-shaped slot therein which receives the first adjustment screw.

4. The combination of claim 1, wherein the second adjustment screw is mounted on the dovetail slider by an adjustment block including a U-shaped slot therein which rotatably receives the second adjustment screw.

* * * * *